//

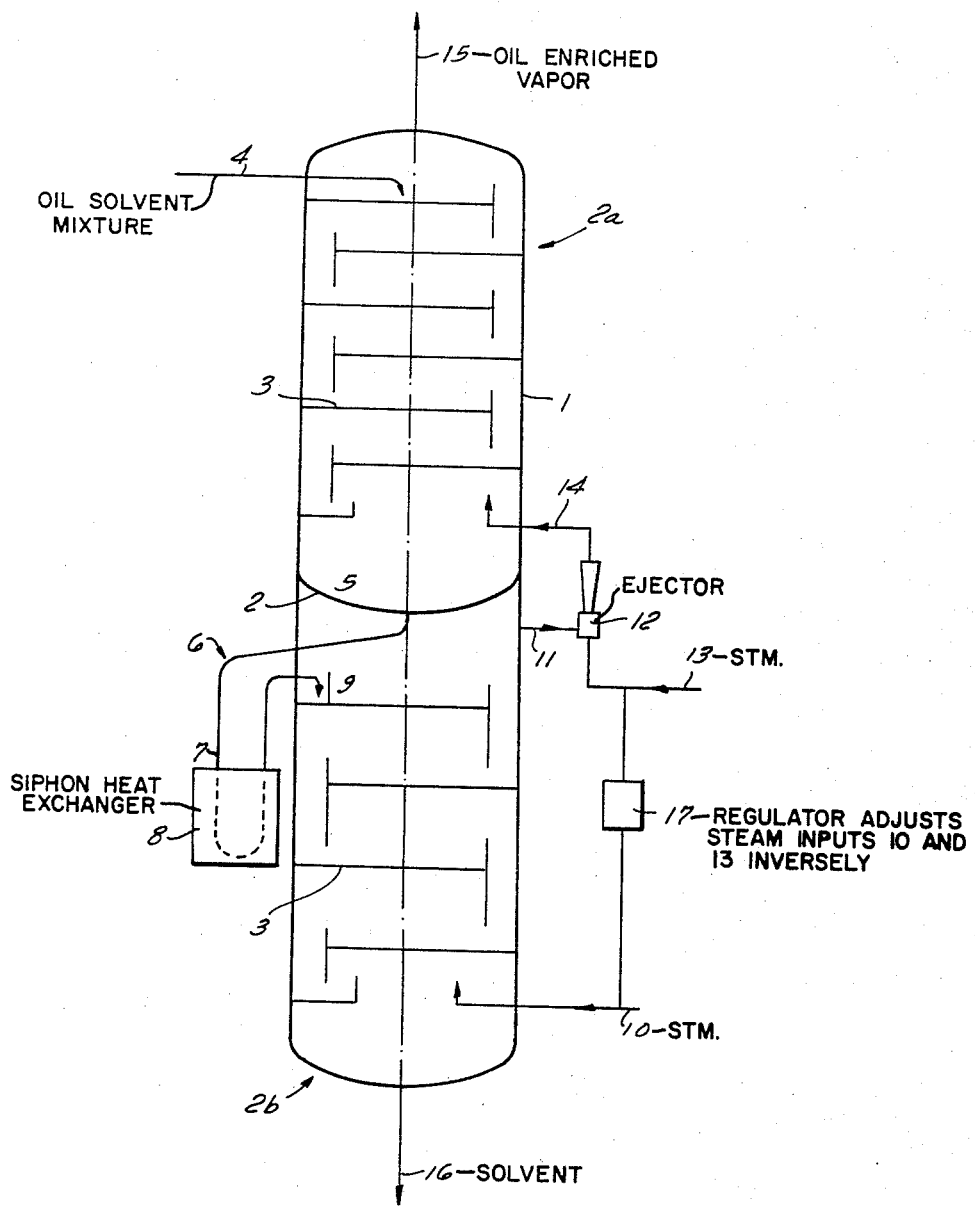

United States Patent Office 3,421,567
Patented Jan. 14, 1969

---

3,421,567
METHOD AND APPARATUS FOR EXTRACTING A VAPORIZABLE COMPONENT FROM A LIQUID
Alfred Hoppe, Frankfurt, Germany, assignor to Edeleanu Gesellschaft m.b.H., Frankfurt, Germany
Filed July 19, 1966, Ser. No. 566,369
Claims priority, application Germany, July 28, 1965, E 29,790
U.S. Cl. 159—16
Int. Cl. B01d 1/14; B01d 3/00
12 Claims

ABSTRACT OF THE DISCLOSURE

A method and an apparatus for extracting a vaporizable component from a liquid, wherein at least a preceding and a subsequent countercurrent extraction vessel are connected in series. Means is provided for passing fluid containing a vaporizable component serially through the preceding and subsequent extraction vessels. Feed means passes a gaseous extraction medium in countercurrent to the liquid first through subsequent and then through the preceding vessel. The feed means includes admitting means for admitting additional gaseous extraction medium into the preceding vessel and transfer means for transferring gaseous extraction medium from a subsequent vessel into the preceding vessel to thereby create in the latter a pressure which is lower than that of the former.

---

The present invention relates to the extraction of vaporizable components from a liquid phase. More specifically, the invention relates to a method of extracting such a vaporizable component, and furthermore to an apparatus for carrying out the method.

In industries using extracting processes it is well known to extract vaporizable components, usually a volatile solvent, from a liquid phase which latter will hereinafter be referred to for reasons of simplicity as "liquid." Such vaporizable components, hereafter simply called "solvents," are needed for treating certain substances and must in the interest of economy be recovered when the treatment is completed. This is particularly true in the cases where the quantity of solvent involved is relatively large, as in the treatment of hydrocarbon mixtures.

A certain quantity of the solvent can usually be recovered very readily, but a residue always remains after the initial recovery processes. To also recover this residual solvent content of the liquid, various approaches have been developed in the industry. One of these utilizes an upright tower or column through which the solvent-rich liquid is continuously passed in downward direction. The column, having a single internal chamber, has arranged therewithin a plurality of vertically spaced, horizontal plates, which term as herein used may comprise overflow-type trays or perforated plate members. Steam under pressure is introduced at the bottom of the column and rises therein in counterflow to the liquid. Contact of the steam with the liquid vaporizes the solvent so that the same can be carried away by the steam. In an apparatus of this type a pressure differential is established within the column between the upper and lower ends of the same, such pressure differential being the result of the plates disposed in the chamber. The pressure which thus develops is lower at the upper end of the column than at the lower end thereof. The higher this pressure differential is, the more steam or, putting this differently, heat energy is needed for the extraction process.

It has therefore long been attempted to maintain the overall column pressure per se as well as the pressure differential as low as possible. Such an arrangement would have the advantage—all other factors being equal—of requiring less steam for recovering the same quantity of solvent than is needed in the above-described prior-art apparatus. Attempts in this direction have resulted in the provision of columns in which a steam inlet is associated with each of the individual plates. However, although this represents an improvement, these columns suffer from the disadvantage that the quantity of steam which is admitted to the respective plates is limited in its capability of absorbing vaporized solvent by the degree of concentration of solvent in the liquid reaching the respective plates. Thus, a given quantity of steam acting upon liquid passing over or through the lowermost plate in the column, where the concentration of solvent in the liquid is already low, can absorb only a fraction of the quantity of solvent which an identical quantity of steam acting upon the liquid passing over or through the uppermost plate of the column can absorb, when the concentration of solvent in the liquid is still high. Obviously, the total quantity of steam needed in a column so constructed is greater than what is actually required for recovering the solvent.

It is therefore a general object of the present invention to provide a method of extracting a vaporizable component from a liquid, and specifically a method which is not subject to the above-mentioned disadvantages of the prior art.

A still more specific object of the invention is to provide such a method in which only as much extraction medium, generally steam, must be expended as is necessary to extract a given amount of solvent.

A concomitant object of the invention is to provide a method such as that outlined above, in which the extraction efficiency of the extraction medium is utilized to the fullest.

Yet a further object of the invention is to provide such a method in which the higher pressure at the lower end of the column is substantially smaller than is known from the prior art.

An additional object of the invention is to provide such a method in which the pressure differential which develops in the column is kept at a lower value than known heretofore.

It is further an object of the invention to provide an apparatus for carrying out the method.

One feature of my invention resides in a method of extracting a vaporizable component from a liquid. In accordance with this method of the liquid containing the vaporizable component or solvent is continuously fed in a downward direction so as to cause it to successively traverse two consecutively arrayed elongated enclosed spaces from the respective upstream ends to the respective downstream ends thereof. While the liquid thus passes through the spaces in one direction, a vaporous extraction medium is continuously fed through the downstream space in counterflow to the liquid and is thereby enriched with the component to be separated which, it will be understood, vaporizes and unites with the vaporous extraction medium. Furthermore, additional extraction medium is continuously admitted in counterflow to the liquid into the downstream end of the upstream space and such additional extraction medium of course will become saturated with vaporous component removed from the liquid in the upstream space. While this take place, enriched extraction medium is continuously transferred from the upstream end of the downstream space into the downstream end of the upstream space and by this I achieve not only a reduction of the pressure in the downstream space, but a simultaneous increase of the pressure in the upstream space since the enriched extraction medium is of course added to the additional extraction medium in the upstream space. Finally, my method further comprises the step of continuously withdrawing all of the saturated extraction medium from the upstream end of the upstream space.

The advantage of this method will be obvious. The downstream space continuously receives liquid from which a large portion of the solvent has already been removed in the upstream space. By lowering the pressure in the downstream space it becomes possible to use lesser quantities of steam in the downstream space than would otherwise be necessary. On the other hand, such lesser quantities of steam are entirely sufficient to remove the residual solvent still contained in the liquid which enters the downstream space from the upstream space so that the quantity of steam thus expended is kept to the minimum necessary for accomplishing this task. Secondly, the steam which has passed through the downstream space and is now enriched with vaporized solvent is made to perform additional work by being fed from the downstream space into the upstream space, together with additional steam which provides the additional pressure required in the upstream space. Thus, the already enriched steam which has been transferred from the downstream space will perform additional work in that in the upstream space it becomes fully saturated with further solvent. Thus, it is possible to use less additional steam than would otherwise be necessary for producing the requisite pressure in the upstream space as well as for achieving the desired degree of solvent recovery from the liquid flowing through the same.

An apparatus for carrying out the above-outlined method comprises at least a preceding and a subsequent countercurrent extraction vessel which are connected with one another in series. It is further provided with means for passing fluid containing a vaporizable component serially through the preceding and subsequent extraction vessels, and with feed means which serves to pass a gaseous extraction medium in countercurrent to the liquid first through the subsequent and then through the preceding extraction vessel. This feed means includes admitting means for admitting additional gaseous extraction medium into the preceding extraction vessel, and transfer means for transferring gaseous extraction medium from the subsequent extraction vessel into the preceding extraction vessel, thus creating in the subsequent extraction vessel a pressure which is lower than the pressure in the preceding extraction vessel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the single figure is a schematic view of an apparatus in accordance with the present invention.

Discussing the figure now in detail, it will be seen that reference numeral 1 indicates the column as a whole, whereas reference numeral 2 indicates a partition which subdivides the interior of the column into the upper chamber 2a and the lower chamber 2b which constitute the respective extraction vessels. Arranged vertically spaced from one another in both the upper chamber 2a and the lower chamber 2b are suitable deflecting arrangements, such as overflow trays or perforated plates 3. A conduit 4 communicates with the upper end of the chamber 2a and introduces the solvent-containing liquid thereinto. By way of example it may be mentiioned that such liquids may by mixtures consisting of hydrocarbon oils and such solvents as dichloroethane or furfural and similar substances.

The liquid flows downwardly in chamber 2a over the various plates 3 and accumulates in the lower end of chamber 2a in form of a sump 5. A conduit 6 communicates with the lower end of chamber 2a, for instance through the partition 2 as shown, and in the exemplary embodiment shown in the figure this conduit comprises a portion 7 which is located outside the column 1. This portion 7 constitutes a siphon which is constantly filled with liquid and thus serves to seal the chambers 2a and 2b from one another against passage of gaseous medium. It will be noted that a part of the conduit portion 7 is shown in dot-dash lines, surrounded by a box 8. This box 8 is to indicate a heating means which may consist of any well-known heating arrangement. The provision of such a heating means may be necessary if the liquid which accumulates in the sump 5 still contains a significant portion of solvent which, of course, vaporizes with resultant considerable cooling of the liquid. In such a case the heating means may be provided to re-heat the liquid. In fact, it is also possible to utilize the heating means 8 by itself.

The free end of conduit 6, that is the end remote from the partition 2, communicates with the chamber 2b in the upper region thereof, as is indicated by reference numeral 9. It will be obvious that liquid introduced from sump 5 through conduit 6 and into the chamber 2b will flow through and over the plates 3 arranged in the chamber is downward direction, just as is the case in the upper chamber 2a.

Reference numeral 10 indicates the conduit through which steam is introduced into the lower region of chamber 2b, so that it rises therein in counterflow to the movement of the liquid. During such counterflow, the solvent contained in the liquid vaporizes and is carried along by the rising steam.

Arranged adjacent the upper region of the chamber 2b, but outside of the latter, is a steam-jet ejector. Such ejectors are well known and are, for example, described on page 1453ff of Perry's "Chemical Engineers' Handbook," third edition, 1950. Ejectors of this construction are a simplified type of vacuum pump which has no moving parts, and they consist essentially of a steam nozzle which discharges a high-velocity jet of steam across a suction chamber connected with the space to be evacuated. This, of course, results in the creation of a vacuum in the suction chamber so that gas in the space to be evacuated is drawn into the suction chamber and entrained by the steam which carries it away. In the present instance the suction chamber of the steam-ejector 12 is connected with an outlet conduit 11 communicating with the chamber 2b at the upper region thereof. A steam-carrying conduit 13 is connected with the ejector 12 and passes the high-velocity jet of steam therethrough. The resulting vacuum withdraws from the chamber 2b the steam which was originally introduced through conduit 10 and which is now enriched with vaporized solvent. The steam jet of the ejector 12 entrains this mixture and injects it through a conduit 14 into the lower region of the upper chamber 2a. Thus it will be seen that the mixture removed from the lower chamber 2b is fortified with new steam—which simultaneously serves as the means of entraining the mixture—so that the resulting composite mixture is able to create in the chamber 2a a higher pressure than would be possible for either the original mixture from chamber 2b or the steam jet alone, and the composite mixture is further able to absorb greater quantities of vaporized solvent than either the original mixture or the new stream along would be capable of handling. The composite mixture rises in the chamber 2a in counterflow to the liquid entering through conduit 4 and is withdrawn from the upper region of the chamber 2a in saturated form through a conduit identified with reference numeral 15. Conversely, the purified liquid issues from the lower region of the lower chamber 2b through conduit 16.

In accordance with a further feature of the invention there is provided a suitable control means 17 of any well-known type which is operatively connected with both the conduits 10 and 13 and permits adjusting of the quantity of steam passing through the conduit 13 in dependence upon the quantity of steam passing through the conduit 10. In other words, the lower the quantity of steam introduced into the chamber 2b, the higher the quantity of steam which will be selected for introduction into the chamber 2a via the conduit 13 and the steam-jet ejector 12.

The novel apparatus described hereinbefore has in actual tests been found to be highly effective and to provide considerable advantages over the type of column having a single interior chamber. This will be evident from the table which follows hereafter and which indicated the results of a comparison test conducted with an apparatus constructed in accordance with the present invention and with an apparatus of the conventional type described before.

TABLE

|  | Novel apparatus (upper and lower chamber) | Conventional apparatus (single chamber) |
| --- | --- | --- |
| Number of plates in column | 10 | 10. |
| Partition arranged between plates | 5 and 6 |  |
| Pressure at upper part of upper chamber | 300 torrs | 300 torrs. |
| Pressure at lower part of upper chamber | ~315 torrs |  |
| Pressure at upper part of lower chamber | ~60 torrs |  |
| Pressure at lower part of lower chamber | ~75 torrs | 330 torrs. |
| Liquid rate to be treated (oil/solvent mixtures). | 22,000 kg./h. oil | 22,000 kg./h. oil |
|  | 13,000 kg./h. solvent | 13,000 kg./h. solvent. |
| Temperature of oil/solvent mixture | ~130° C | ~130° C |
| Quantity rate of steam injected at lower part of column. | 500 kg./h | 600 kg./h. |
| Temperature and gage pressure of steam | 200° C.; 2.8 kg./cm² | 200° C.; 2.8 kg./cm². |
| Quantity rate of steam injected at lower part of upper chamber. | 100 kg./h |  |
| Temperature and gage pressure of steam injected at lower part of upper chamber. | 200° C.; 2.8 kg./cm² |  |
| Solvent content of resulting final product | <10 p.p.m | 50 p.p.m. |

It will be understood that each of the elements described above, or two or more together, may also find a useful application in other types of apparatus for extracting a vaporizable component from a liquid differing from the types described above.

While the invention has been illustrated and described as embodied in apparatus for extracting a vaporizable component from a liquid, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A multistage distilling apparatus for extracting a vaporizable component from a liquid comprising, in combination, at least a preceding and a subsequent countercurrent extraction vessel connected in series; means for passing fluid containing a vaporizable component serially first through said preceding and then through subsequent extraction vessels; and feed means for passing a gaseous extraction medium in countercurrent to said liquid first through said subsequent and then through said preceding extraction vessels, said feed means including additional admitting means for admitting additional gaseous extraction medium into said preceding extraction vessel and transfer means for transferring partially enriched gaseous extraction medium from the upper portion of said subsequent extraction vessel into said preceding extraction vessel, so as to create in said subsequent extraction vessel a pressure lower than the pressure in said preceding extraction vessel.

2. Apparatus as defined in claim 1; and further comprising guide means provided in said vessels and defining respective circuitous paths therein along which said liquid must pass.

3. Apparatus as defined in claim 2, wherein said guide means comprises a plurality of vertically spaced horizontal dispersing plates.

4. Apparatus as defined in claim 1; and further comprising connecting means connecting said vessels with one another so that the liquid can pass from said preceding into said subsequent extraction vessel, said connecting means comprising conduit means having a first portion connected with said preceding vessel, a second portion arranged externally of said extraction vessels and connected with said first portion, and a third portion connected with said second portion and communicating with said subsequent vessel for admitting the liquid thereinto.

5. Apparatus as defined in claim 4, wherein said conduit means constitutes a siphon.

6. Apparatus as defined in claim 4; and further comprising heating means operatively connected with said conduit means for heating liquid passing therethrough.

7. Apparatus as defined in claim 1, wherein said extraction medium is steam.

8. Apparatus as defined in claim 1, wherein said transfer means comprises a conduit connecting said vessels for transferring partially enriched extraction medium from the subsequent into the preceding vessel.

9. Apparatus as defined in claim 1, wherein said transfer means comprises a steam-jet ejector, said admitting means being constituted by the discharge conduit of said steam-jet ejector and said additional extraction medium being the steam-jet of said ejector, said steam-jet ejector not only admitting the steam-jet into said preceding vessel but also aspirating partially enriched extraction medium from said subsequent vessel and transferring it into the preceding vessel.

10. A method of extracting a vaporizable component from a liquid, comprising the steps of continuously feeding the liquid in a predetermined direction so as to cause it to successively traverse two consecutively arrayed elongated enclosed spaces from the respective upstream to the respective downstream ends of the latter; continuously feeding an extraction medium in counterflow to the liquid through the downstream space so as to be enriched with component from the liquid therein; continuously admitting additional extraction medium in counterflow to the liquid into the downstream end of the upstream space only so that such additional extraction medium is saturated with component from said liquid; continuously transferring enriched extraction medium from the upstream end of said downstream space into the downstream end of said upstream space so as to reduce pressure in said downstream space while increasing it in said upstream space; and continuously withdrawing all of the saturated extraction medium from the upstream end of said upstream space.

11. A method as defined in claim 10, wherein the pressure prevailing at the downstream ends of the respective spaces is greater than the pressure at the upstream ends, the maximum pressure in said downstream space being considerably lower than the minimum pressure in said upstream space.

12. A multistage apparatus for extracting a vaporizable component from a liquid comprising, in combination, at least a preceding and a subsequent countercurrent extraction vessel connected in series; means for passing fluid containing a vaporizable component serially through said preceding and subsequent extraction vessels; feed means for passing a gaseous extraction medium in countercurrent to said liquid first through said subsequent and then through said preceding extraction vessels, said feed means including admitting means for admitting additional gaseous extraction medium into said preceding extraction vessel, and transfer means for transferring gaseous extraction medium from said subsequent extraction vessel into said preceding extraction vessel, thus creating in said subsequent extraction vessel a pressure being lower than the pressure in said preceding extraction vessel; and regulating means operative for regulating the quantity of additional extraction medium admitted into said preceding vessel in dependence upon and in inverse proportion to the quantity of extraction medium admitted into said subsequent vessel.

References Cited

UNITED STATES PATENTS

| | | | |
|---|---|---|---|
| 1,912,010 | 5/1933 | Ricard et al. | 203—85 |
| 2,216,933 | 10/1940 | Atkins | 208—321 X |
| 2,368,669 | 2/1945 | Lee et al. | 203—49 X |
| 2,437,649 | 3/1948 | Millner | 203—85 X |
| 2,801,209 | 7/1957 | Muller et al. | 203—85 X |

NORMAN YUDKOFF, *Primary Examiner.*

J. SOFER, *Assistant Examiner.*

U.S. Cl. X.R.

203—78, 79; 208—321